United States Patent [19]
Sobajima et al.

[11] Patent Number: 5,747,576
[45] Date of Patent: May 5, 1998

[54] PROPYLENE RESIN COMPOSITIONS CONTAINING TALC

[75] Inventors: Yoshihiro Sobajima; Etsushi Akashige; Masahide Hamaura; Takeshi Hiramatsu; Akira Yamaji, all of Mie, Japan

[73] Assignee: Mitsubishi Chemical Corporation, Tokyo, Japan

[21] Appl. No.: 932,966

[22] Filed: Sep. 17, 1997

Related U.S. Application Data

[63] Continuation of Ser. No. 719,642, Sep. 25, 1996, abandoned.

[30] Foreign Application Priority Data

| Sep. 29, 1995 | [JP] | Japan | 7-253809 |
| Sep. 6, 1996 | [JP] | Japan | 8-236617 |

[51] Int. Cl.$^6$ ............................................. C08K 3/34
[52] U.S. Cl. ............................................. 524/451; 525/451
[58] Field of Search ........................... 525/240; 524/451

[56] References Cited

U.S. PATENT DOCUMENTS

| 5,001,182 | 3/1991 | Maruya et al. | 524/427 |
| 5,219,913 | 6/1993 | Tomomatsu et al. | 524/451 |
| 5,308,908 | 5/1994 | Fukui et al. | 524/451 |
| 5,391,618 | 2/1995 | Yamamoto et al. | 525/88 |
| 5,438,091 | 8/1995 | Saito et al. | 524/505 |
| 5,461,105 | 10/1995 | Saito et al. | 524/505 |
| 5,464,905 | 11/1995 | Tsutsui et al. | 525/240 |
| 5,543,454 | 8/1996 | Kamakura et al. | 524/451 |

FOREIGN PATENT DOCUMENTS

| 2 206 886 | 1/1989 | United Kingdom . |
| 2 281 302 | 3/1995 | United Kingdom . |

OTHER PUBLICATIONS

Chemical Abstracts, AN–124: 233 982, JP-A-07 331 221, Dec. 19, 1995.

*Primary Examiner*—Melvyn I. Marquis
*Attorney, Agent, or Firm*—Oblon, Spivak, McClelland, Maier & Neustadt, P.C.

[57] ABSTRACT

A propylene resin composition containing talc, comprising the following components (a), (b) and (c) is provided: (a) 100 parts by weight of a propylene/ethylene block copolymer containing a crystalline propylene homopolymer part (Unit A part) and an ethylene/propylene random copolymer part (Unit B part); (b) 0.1 to 80 parts by weight of talc having an average particle size of 1.5 to 20 microns and an average aspect ratio of not less than 4; and (c) 2 to 80 parts by weight of an ethylene/α-olefin copolymer polymerized by using a metallocene catalyst, and containing an α-olefin having 3 to 16 carbon atoms. This composition has good paintability, molding processability (fluidity) and excellent mechanical strength balance, and is useful for a material for e.g., automobile parts.

7 Claims, No Drawings

PROPYLENE RESIN COMPOSITIONS CONTAINING TALC

This application is a Continuation of application Ser. No. 08/719,642, filed on Sep. 25, 1996, now abandoned.

BACKGROUND OF THE INVENTION

1. Field of the Invention

The present invention relates to a new propylene resin composition containing talc which exhibits excellent paintability, molding processability and mechanical strength balance, for example, high rigidity and high impact strength at a low temperature, and which is suitable as a raw material for various industrial parts including parts of automobiles.

2. Discussion of the Background

Reinforced propylene resin compositions compounded with fillers such as talc, mica and various fibers, as well as various rubber products have conventionally been widely employed for various practical uses such as for molded products in the field of industrial parts, for example, parts of automobiles such as bumpers, instrument panels, fan shrouds, and glove boxes, or parts of household electric appliances including television sets, VTRs, washing machine covers, and vacuum cleaner cases, by taking full advantage of its excellent paintability, moldability, mechanical strength, and inexpensiveness. As the above-mentioned products require higher level functions and incresing in sizes, the quality of the propylene resin composition must also satisfy higher standards of the requirements such as a thinner wall thickness and a more complicated design of the molded product. Accordingly, to meet this requirement, various technical improvements have been made to the polypropylene, talc and rubber components, such as pulverizing the talc, and improving the quality of the ethylene/propylene copolymer rubber. However, no effective solution has been proposed to satisfy an even higher standard, for example, in the improvement of the paintability, to impart good paintability without carrying out degreasing treatment with trichloroethane.

SUMMARY OF THE INVENTION

An object of the present invention is to impart high level paintability which do not require degreasing treatment with trichloroethane, excellent molding processability (fluidity), and high level of mechanical strength balance represented by the high rigidity and high impact strength at a low temperature, to the propylene resin compositions.

Another object of the present invention is to attain excellent productivity (economical production) in a production of the above-mentioned propylene resin composition.

As a result of an intensive study to solve the above-mentioned problems, the present inventors found that a propylene resin composition obtained by compounding a specific propylene/ethylene block copolymer, a specific ethylene/α-olefin copolymer and talc powder at a specific ratio, has high level of paintability which does not require the degreasing treatment with trichloroethane, excellent molding processability (fluidity), and high level of mechanical strength balance represented by high rigidity and high impact strength at a low temperature, and came to complete the present invention.

Accordingly, an aspect of the present invention is to provide a propylene resin composition containing talc, comprising the following components (a), (b) and (c):

(a) 100 parts by weight of a propylene/ethylene block copolymer containing 50 to 95% by weight of a crystalline propylene homopolymer part (Unit A part) and 5 to 50% by weight of an ethylene/propylene random copolymer part (Unit B part), (b) 0.1 to 80 parts by weight of talc having an average particle size of 1.5 to 20 microns and an average aspect ratio of not less than 4, and (c) 2 to 80 parts by weight of an ethylene/α-olefin copolymer polymerized by using a metallocene catalyst, having a melt flow rate of more than 15 g/10 min and not more than 200 g/10 min, and a density of 0.85 to 0.91 g/cm$^3$, and containing 10 to 65% by weight of an α-olefin having 3 to 16 carbon atoms.

Another aspect of the present invention is to provide "a propylene resin composition containing talc, comprising the following components (a), (b) and (c):

(a) 100 parts by weight of a propylene/ethylene block copolymer having a melt flow rate of 10 to 200 g/10 min, and containing 60 to 95% by weight of a crystalline propylene homopolymer part (Unit A part) and 5 to 40% by weight of an ethylene/propylene random copolymer part (Unit B part), (b) 0.1 to 80 parts by weight of talc having an average particle size of 1.5 to 20 microns and an average aspect ratio of not less than 4, and (c) 2 to 60 parts by weight of an ethylene/α-olefin copolymer polymerized by using a metallocene catalyst, having a melt flow rate of more than 15 g/10 min and not more than 200 g/10 min, and a density of 0.85 to 0.90 g/cm$^3$, and containing 15 to 50% by weight of 1-octene.

The propylene resin composition according to the present invention does not require degreasing treatment with trichloroethane before coating and has high level of paintability, good molding processability (fluidity) and excellent mechanical strength balance represented by high rigidity and high impact strength at a low temperature, thus can provide a very important material for various industrial parts including various automobile parts such as thin-gage bumpers.

DETAILED DESCRIPTION OF THE INVENTION

The propylene resin composition containing talc according to the present invention will be described in detail.

(1) Constituents

Component (a): A propylene/ethylene block copolymer

The propylene/ethylene block copolymer of the above-mentioned component (a) which constitutes the propylene resin composition containing talc according to the present invention is a propylene/ethylene block copolymer containing 50 to 95% by weight of a crystalline propylene homopolymer part (Unit A part) and 5 to 50% by weight of an ethylene/propylene random copolymer part (Unit B part). A preferable content of Unit A part and that of Unit B part are 60 to 95% by weight and 5 to 40% by weight respectively, more preferably 70 to 95% by weight and 5 to 30% by weight, particularly preferably 75 to 93% by eight and 7 to 25% by weight.

If the amount of Unit A part is too little, the resulting rigidity becomes insufficient, but if the amount is too much, the resulting impact resistance becomes insufficient.

The content of the above-mentioned Unit B part was obtained by reverse operation from the weight of the solid phase which was obtained by immersing and dissolving 2 g of a sample in 300 g of boiling xylene for 20 minutes, cooling it to a room temperature, and filtering out the precipitating solid phase by a glass filter followed by drying.

The density of the Unit A part is preferably not less than 0.9070 g/cm$^3$ in view of heat resisting rigidity, preferably not less than 0.9080 g/cm$^3$, and the ethylene content of the Unit B part is preferably 20 to 80% by weight, more preferably 30 to 80% by weight, particularly preferably 30 to 60% by weight, in view of impact strength and paintability.

In addition to that, the weight average molecular weight (Mw) of Unit B part is preferably not more than 600,000, more preferably 150,000 to 400,000 in order to attain higher level of mechanical strength balance and better paintability.

The value of Mw was measured by gel permeation chromatography (GPC) and the ethylene content was measured by infrared spectrum analysis and the like, respectively.

From the view point of molding processability and impact strength, the overall MFR of the component (a) is preferably 10 to 200 g/10 min, more preferably 20 to 150 g/10 min, particularly preferably 30 to 120 g/10 min. This MFR was measured at 230° C., under the load of 2.16 kg according to the stipulation of JIS-K7210.

The adjustment of the MFR is preferably carried out, from the view point of paintability and the molded product's external appearance, by controlling various conditions such as temperature and pressure during the polymerization, but it can be controlled by other processes such as treatment of the polymer using various peroxides after the polymerization. As the peroxides, those having a temperature at which the half-life of the peroxide becomes 10 hours is not lower than 100° C. and a temperature at which the half-life of the peroxide becomes 1 minute is not lower than the melting point of the propylene polymer are preferable. Examples of such peroxides include cumene hydroperoxide, diisopropyl benzene hydroperoxide, 1,3-bis(t-butylperoxy-isopropyl) benzene, dicumyl peroxide and the like.

The propylene/ethylene block copolymer of such component (a) is produced by slurry polymerization, gas phase polymerization or liquid phase bulk polymerization by the use of a highly stereoregular catalyst, and the gas phase polymerization is preferable from the view point of resulting paintability and the cost. In the case of the gas phase polymerization, control of Mw in Unit B part can be relatively easily carried out and those having Mw of not more than 600,000, particularly not more than 400,000 can be easily polymerized. As the polymerization method, both batch polymerization and continuous polymerization can be employed, however, continuous polymerization is more preferable.

For producing the propylene/ethylene block copolymer, it is preferable from the view point of product quality that Unit A part is first produced by homopolymerization of propylene, then Unit B part is formed by random copolymerization of propylene and ethylene.

In one illustrative production method, magnesium chloride is contacted with titanium tetrachloride, an organic acid halide and an organic silicon compound to form a solid component, and an organic aluminium compound component is combined therewith to form a catalyst, which is then used for homopolymerization of propylene, followed by random copolymerization of propylene and ethylene.

The propylene/ethylene block copolymer can be a copolymer of three or more elements containing other unsaturated compounds including α-olefins such as 1-butene, or vinyl esters such as vinyl acetate and the like, in such an amount that does not asdversely effect present invention, or a mixture thereof.

The form of the propylene/ethylene block copolymer after the polymerization is not particularly limited, however, usually it is in the form of powder or pellets and the like. From the view point of productivity during the kneading and granulation of the resin composition according to the present invention, it is preferable that the propylene/ethylene block copolymer is in the form of pellets, or a mixture of pellets and powder.

That is because, for granulation of the resin composition according to the present invention, the presence of the propylene/ethylene block copolymer in the form of pellets provides excellent feeding of a mixture of the propylene/ethylene block copolymer and the compressed talc which is the below-mentioned component (b), to an extruder, in other words, it provides good bite into the screw part.

Component (b): Compressed talc

The talc of the component (b) of the propylene resin composition containing talc according to the present invention is the talc having an average particle size of 1.5 to 20 microns, preferably 1.5 to 10 microns, more preferably 1.5 to 6 microns, and an average aspect ratio of not less than 4, preferably not less than 5, more preferably not less than 6. A talc having such an average particle size that is outside the above-mentioned range is not appropriate since it results in inferior mechanical strength balance. A talc having an average aspect ratio that is outside said range is not appropriate either since it also results in inferior mechanical strength balance.

The whole length of the talc of the component (b) is preferably and substantially not more than 15 microns. By the term "substantially" we mean that inclusion of the talc outside said range may be allowed as far as the effect of the present invention is not remarkably marred.

The average particle size is a value measured by a particle-size distribution counter by laser beam scattering method (for example, LA-500 type produced by Horiba, Ltd), and the aspect ratio and the length are measured by the use of microscope and the like.

The method of producing the talc is not particularly limited, however, an illustrative example includes the following process. First, talc raw ore is ground by an impact crusher or a micron mill type grinder, then pulverized by a jet mill, etc., and classified by a cyclone, micron separator and the like to provide a talc powder.

A talc raw ore can be obtained in various regions, but a raw ore produced in China is preferable due to its low metal impurity content.

A talc can be previously subjected to surface treatment with a surfactant, coupling agent or metal soap and the like. The talc subjected to the surface treatment is effective in further improving mechanical strength balance, paintability, and molding processability.

So-called compressed talc having an apparent volume weight ratio of not more than 2.50 ml/g, preferably not more than 2.20 ml/g, and more preferably 0.90 to 2.20 ml/g, which is obtained by compressing and degassing the above-mentioned talc powder at a compression ratio of not less than 1.10, preferably not less than 1.50, more preferably not less than 2.00, can be used as well.

The apparent volume weight ratio is a value measured by stationary method of JIS-K5101, and the compression ratio was calculated according to the following equation.

Compression ratio=(the apparent volume weight ratio of the talc powder prior to the compression)/(the apparent volume weight ratio of the compressed talc)

The talc having an apparent volume weight ratio under said lower limit tends to show poor talc particle dispersibility in the resin during the pelletizing.

This compressed talc, when used, not only provides high productivity during the kneading and pelletizing of the resin compositions, but also provides an excellent working environment since it barely scatters like ordinary uncompressed talc powder does, preventing contamination in or nearby the factory due to scattering as well as inclusion of foreign substances and the like into other products. Accordingly, it is very useful from the view point of decreasing defective products. The talc itself has small bulkiness, thus transportation cost can be cut as well.

The method of producing the compressed talc is not particularly limited, however, an illustrative example includes the following process. The talc powder obtained by pulverizing and classification as mentioned above is appropriately degassed in a vacuum degassing vessel and supplied to a hopper having a built-in screw, then, at a lower stage, subsequently sent to a roll type compactor, and compressed by rolls to give a product in the form of small lumps.

In order to improve the adhesive properties among the compressed talc particles, water or various chemical binders may be used. However, with a view to keeping good dispersibility of the talc in resin during pelletizing, it is preferable not to use such binders if possible.

The compressed talc can be produced from a talc powder subjected to surface treatment with a surfactant, coupling agent or metal soap and the like, or such surface treatment can be given during the compression process. A compressed talc subjected to the surface treatment is effective in further improving mechanical strength balance, paintability, and molding processability.

Component (c): An ethylene/α-olefin copolymer The ethylene/α-olefin copolymer of the component (c) constituting the propylene resin composition according to the present invention contains an α-olefin having 3 to 16 carbon atoms, preferably 3 to 8 carbon atoms, more preferably 4 to 8 carbon atoms in an amount of 10 to 65% by weight, preferably 15 to 50% by weight, more preferably 18 to 50% by weight, and particularly preferably 20 to 50% by weight, and has MFR of more than 15 g/10 min, and not more than 200 g/10 min, preferably more than 20 g /10 min and not more than 150 g/10 min, particularly preferably 50 to 100 g/10 min, and a density of 0.85 to 0.91 g/cm$^3$, preferably 0.855 to 0.895 g/cm$^3$, more preferably 0.860 to 0.895 g/cm$^3$.

It is further preferable that the ethylene/α-olefin copolymer has ethylene triad sequence measured by $^{13}$C-NMR of 55 to 70%, particularly 57 to 70%. When the value is less than 55%, the propylene resin composition containing talc according to the present invention tends to show an inferior rigidity and if it exceeds 70%, the composition tends to show inferior impact strength and poor paintability. The ethylene triad sequence is a value calculated using area intensity of $^{13}$C-NMR signals according to the description in Journal of Japan Rubber Association Vol. 60, No. 1 (1987) p. 38, to give the ratio of the structure made of 6 methylene groups connected in the alkyl groups having 6 carbon atoms.

Illustrative examples of α-olefins include propylene, 1-butene, 1-pentene, 1-hexene, 1-heptene, 1-octene, 1-nonene, 1-decene, 1-undecene and 1-dodecene.

Among them, preferable are propylene, 1-butene, 1-pentene, 1-hexene, 1-heptene and 1-octene, particularly preferable is 1-octene.

The ethylene/α-olefin copolymer is polymerized by such methods as a gas phase fluidized bed method, solution method, slurry method and high-pressure polymerization method, and a small amount of a diene component such as dicyclopentadiene and ethylidene norbornene can be co-polymerized as well.

As for the polymerization catalyst, it is important to use a so-called metallocene catalyst.

An ethylene/α-olefin copolymer polymerized using a catalyst other than the metallocene catalyst is not preferable since when used for the component (c) of the propylene resin composition containing talc according to the present invention, the resulting mechanical strength balance and the paintability become inferior.

The metallocene catalyst does not need to contain Alumoxane. However, a catalyst obtained by combining a metallocene compound and Alumoxane, i.e. a so-called Kaminsky type catalyst is preferable, and examples of such catalysts are given in Japanese Patent Laid-Open Nos. 58-19309, 59-95292, 60-35005, 60-35006, 60-35007, 60-35008, 60-35009, preferable examples are given in Japanese Patent Laid-Open No. 3-163088, EP No. 420436, U.S. Pat. No. 5,055,428, and a particularly preferable example is given in WO 91/04257.

The ethylene/α-olefin copolymer having too little α-olefin content is not appropriate since it results in inferior impact strength and poor paintability. Also, the ethylene/α-olefin copolymer having too much α-olefin content is not appropriate either, since not only the rigidity is decreased, but also it becomes difficult to retain the polymer in the form of pellets, so that the productivity of the resin composition is remarkably decreased.

The content of α-olefin is a value measured by ordinary methods such as infrared spectroscopic analysis and $^{13}$C-NMR method, MFR is a value measured according to JIS-K7210 (at 230° C., under a load of 2.16 kg), and density is a value measured according to JIS-K7112.

The ethylene/α-olefin copolymer having too low MFR results in inferior paintability, while the copolymer having too high MFR results in inferior impact strength, thus both copolymers are inappropriate. A copolymer having too high density results in inferior paintability and poor impact strength, while the copolymer having too low density makes pelletizing difficult, thus they are also inappropriate.

Component (d): Other compounding ingredients (optional component)

In addition to the above-mentioned essential components (a) to (c), the following additives and compounding ingredients can be optionally added to the propylene resin composition containing talc according to the present invention, in such amounts that do not remarkably impair the effect of the present invention.

Illustratively, pigments coloring, anti-oxidizing agents, antistatic additives, flame retarding agents, dispersing agents, light stabilizers, nucleating additives, and various resins other than above-mentioned component (a) to (c), various fillers and various rubbers can be used as a compounding agent.

(2) Compounding ratio

Components (a) to (c) are compounded into the propylene resin composition containing talc according to the present invention based on 100 parts by weight of the component (a).

The compounding ratio of the talc of the component (b) is 0.1 to 80 parts by weight, preferably 0.2 to 50 parts by weight, particularly preferably 5 to 40 parts by weight to 100 parts by weight of the component (a).

When the compounding ratio is too little, the resulting composition shows inferior mechanical strength balance (rigidity) and poor size stability, and when it is too much, the resulting composition shows inferior productivity (pelletizing properties), poor external appearance of the resulting molded product, and poor impact strength, thus both cases are not practical.

The compounding ratio of the ethylene/α-olefin copolymer of the component (c) is 2 to 80 parts by weight, preferably 5 to 55 parts by weight, particularly preferably 10 to 50 parts by weight to 100 parts by weight of the component (a). When the compounding ratio is too little, the resulting composition shows inferior impact strength and paintability, and when it is too much, the resulting composition shows inferior mechanical strength balance and poor external appearance of the resulting molded product, thus both cases are not practical.

(3) Production

[Kneading/pelletizing]

The above-mentioned components (a) to (c), and optionally other components (d) are compounded at the above-mentioned ratio, then the mixture is subjected to kneading/pelletizing using a normal kneader such as a single screw extruder, a twin-screw extruder, Banbury mixer, a roll mixer, Brabender Plastograph, and a kneader blender and the like to give the propylene resin composition containing talc according to the present invention.

It is preferable to employ a method by which components can be well dispersed and the kneading and pelletizing can be carried out efficiently, and usually a double-screw extruder is used for the kneading and the pelletizing. The kneading and the pelletizing can be carried out by simultaneously kneading the components (a) to (c) if necessary with the other component (d), but in order to improve the quality of the product, the components can be divided and a part or all of component (a) and component (c) are kneaded first, for example, then the rest of the components can be kneaded and pelletized.

[Molding]

The propylene resin composition containing talc thus obtained is subjected to various molding methods i.e. injection molding, press injection molding, compression molding, extrusion (sheet, film, or blow molding) to give various molded products, however, among these molding methods, injection molding (including gas injection molding) and press injection molding are preferably used.

(4) Uses of the propylene resin composition containing talc

The propylene resin composition containing talc according to the present invention exhibits excellent productivity when it is produced by kneading/pelletizing. Also, since it has high mechanical strength balance (rigidity and impact strength), high paintability which do not require degreasing treatment with trichloroethane, it has sufficient properties for such practical uses as a molding material for producing various industrial parts, including car parts such as bumpers and instrument panels, parts for electrical appliances such as television set cases, etc.

EXAMPLES

To further illustrate the propylene resin composition containing talc according to the present invention, the following examples are given.

<Examples 1–7 and Reference Examples 1–6>

[I] Raw materials
The raw materials are as follows.

(1) Component (a)

a-1: Propylene/ethylene block copolymer produced by gas phase polymerization, containing 90% by weight of Unit A part having a density of 0.9092 g/cm$^3$, and 10% by weight of Unit B part having an ethylene content of 42% by weight, Mw of 310,000, and the overall MFR of component (a) of 50 g/10 min.

a-2: Propylene/ethylene block copolymer produced by gas phase polymerization, containing 86% by weight of Unit A part having a density of 0.9091 g/cm$^3$, and 14% by weight of Unit B part having an ethylene content of 53% by weight, Mw of 290,000, and the overall MFR of component (a) of 80 g/10 min.

a-3: Propylene polymer produced by gas phase polymerization, containing 100% by weight of Unit A part having a density of 0.9091 g/cm$^3$, and the overall MFR of component (a) of 55 g/10 min.

All of the component (a) were in the form of pellets.

(2) Component (b)

b-1: Talc whose whole length is substantially not more than 10 microns, whose average particle size is 3.1 microns, and whose average aspect ratio is 6.

b-2: Talc whose whole length is substantially not more than 10 microns, whose average particle size is 9.3 microns, and whose average aspect ratio is 5.

b-3: Compressed talc having an apparent volume weight ratio of 1.79 ml/g, produced from a talc powder whose whole length is substantially not more than 10 microns, whose average particle size is 2.9 microns, and whose average aspect ratio is 6 by compressing and degassing at the compression ratio of 2.55.

b-4: Talc whose average particle size is 28.5 microns and whose average aspect ratio is 3.

(3) Component (c)

c-1: Ethylene/1-octene copolymer produced by solution polymerization using a metallocene catalyst, having 1-octene content of 25.3% by weight (IR method), MFR of 65.2 g/10 min, a density of 0.868 g/cm$^3$ and ethylene triad sequence of 60.2%.

c-2: Ethylene/1-octene copolymer produced by solution polymerization using a metallocene catalyst, having 1-octene content of 23.5% by weight, MFR of 24.8 g/10 min, a density of 0.886 g/cm$^3$ and ethylene triad sequence of 63.3%.

c-3: Ethylene/1-octene copolymer produced by solution polymerization using a metallocene catalyst, having 1-octene content of 26.1% by weight, MFR of 0.9 g/10 min, a density of 0.861 g/cm$^3$ and ethylene triad sequence of 58.3%.

c-4: Ethylene/1-octene copolymer produced by solution polymerization using a metallocene catalyst, having 1-octene content of 25.4% by weight, MFR of 5.4 g/10 min, a density of 0.869 g/cm$^3$ and ethylene triad sequence of 60.1%.

c-5: Ethylene/1-butene copolymer produced by high-pressure polymerization using a metallocene catalyst, having 1-butene content of 22.9% by weight, MFR of 4.8 g/10 min, a density of 0.878 g/cm$^3$ and ethylene triad sequence of 62.4%.

c-6: Ethylene/propylene copolymer produced by solution polymerization using a vanadium catalyst, having propylene content of 24.0% by weight, MFR of 50.2 g/10 min, a density of 0.861 g/cm$^3$ and ethylene triad sequence of 43.8%.

All variations of the component (c) were in the form of pellets.

[II] Evaluation method

The evaluation was carried out according to the following methods.

[Paintability]

(Primer and paint)

A primer containing chlorinated polypropylene and a two-pack urethane were used.

(Coating method)

The primer was first coated on a flat sheet which had not been subjected to any pre-treatment, by air spray gun to give a coat thickness of about 15 microns. Then the paint was coated on it to give a thickness of about 40 microns.

(Baking)

The coated flat sheet was subjected to baking/drying at 90° C. for 30 minutes. Then the sheet was allowed to stand at a room temperature for 48 hours.

(Peel strength test)

The surface of the coated and baked test piece was cut with a single edged razor blade to provide straight lines at intervals of 10 mm. The belt-like part of the coat was turned over and pulled by a tension testing machine at the speed of 10 mm/min and the peeling load was measured. The value exceeding 1500 g/cm indicates excellent practicability.

[Molding processability]

(Spiral length)

A flow length of injected resin composition in a spiral mold (whose section has an upper side of 6 mm, a lower side of 10 mm, and a thickness of 2 mm) was measured using a screw in-line type injection molding machine (Toshiba Corporation: IS170). The molding condition was as follows; the molding temperature was 240° C., the injection pressure was 800 kg/cm², and the mold-cooling temperature was 40° C.

The longer the spiral distance, the better the molding processability (fluidity), and particularly those having 850 mm or higher, preferably 900 mm or higher are suitable for molding a product having a thin wall thickness.

[Mechanical strength evaluation]

(Flexural modulus)

The flexural modulus was measured according to JIS-K7203. The measurement temperature was 23° C. This value also indicates heat resistance.

(Dart impact strength)

A dart having a diameter of 20 mm, a weight of 4 kg was fallen onto an injection-molded sheet (120×100×2 mm) from a height of 2 m, and the shock absorbed energy was measured. The measuring temperature was −30° C.

[III] Experiments

The above-mentioned component (a) (including an antioxidant), component (b) and component (c) were compounded at the ratio shown in Table 1 and they were mixed sufficiently by a high-speed mixer.

Then they were subjected to kneading/pelletizing using high-speed twin-screw extruder (KCM) produced by Kobe Steel Ltd., and the resulting pellets were subjected to an injection molding machine and test pieces for coating and test pieces for physical properties test were molded and evaluation was carried out. The length of the spiral was measured as well.

The evaluation results are shown in Table 1.

As shown in Table 1, all the resin compositions of Examples 1–7 showed high level of paintability, good molding processability (fluidity) and high mechanical strength balance.

On the other hand, the resin compositions of Comparative examples 1–6 showed poor values in these properties.

TABLE 1

| | propylene type resin composition | | | | | | evaluation | | | |
|---|---|---|---|---|---|---|---|---|---|---|
| | component (a) block copolymer | | component (b) | | component (c) ethylene · α-olefin | | paintability | molding processability | mechanical strength | |
| | (a-3:homopolymer) | | talc | | copolymer | | peel strength | spiral length | flexural | dart impact |
| | species | wt part | species | wt part | species | wt part | (g/cm) | (mm) | modulus (MPa) | at-30° C. (J) |
| Example No | | | | | | | | | | |
| 1 | a-1 | 100 | b-1 | 0.4 | c-1 | 14 | 1.830 | 885 | 1.020 | 6.6 |
| 2 | a-1 | 100 | b-1 | 11 | c-1 | 24 | 2.460 | 935 | 1.350 | 7.3 |
| 3 | a-1 | 100 | b-1 | 36 | c-1 | 45 | 2.520 | 860 | 1.510 | 8.1 |
| 4 | a-1 | 100 | b-1 | 11 | c-2 | 24 | 2.020 | 895 | 1.390 | 6.9 |
| 5 | a-1 | 100 | b-2 | 11 | c-1 | 24 | 2.330 | 945 | 1.300 | 6.3 |
| 6 | a-1 | 100 | b-3 | 11 | c-1 | 24 | 2.400 | 875 | 1.320 | 7.4 |
| 7 | a-2 | 100 | b-1 | 11 | c-1 | 24 | 2.520 | 950 | 1.290 | 8.2 |
| Compara. Example No | | | | | | | | | | |
| 1 | a-1 | 100 | b-1 | 11 | c-3 | 24 | 1.010 | 535 | 1.320 | 7.9 |
| 2 | a-1 | 100 | b-1 | 11 | c-4 | 24 | 1.160 | 630 | 1.360 | 7.7 |
| 3 | a-1 | 100 | b-1 | 11 | c-5 | 24 | 960 | 590 | 1.270 | 4.2 |
| 4 | a-1 | 100 | b-1 | 11 | c-6 | 24 | 670 | 795 | 1.220 | 3.9 |
| 5 | a-3 | 100 | b-1 | 11 | c-1 | 24 | 890 | 890 | 1.480 | 2.6 |
| 6 | a-1 | 100 | b-4 | 11 | c-1 | 24 | — | 870 | 1.110 | 3.4 |

What is claimed is:

1. A propylene resin composition containing talc, consisting essentially of the following components (a), (b) and (c):

(a) 100 parts by weight of a propylene/ethylene block copolymer having a melt flow rate of 10 to 200 g/10 min, and containing 60 to 95% by weight of a crystalline propylene homopolymer part (Unit A part) and 5 to 40% by weight of an ethylene/propylene random copolymer part (Unit B part), (b) 0.1 to 80 parts by weight of talc having an average particle size of 1.5 to 20 microns and an average aspect ratio of not less than 4, and (c) 2 to 60 parts by weight of an ethylene/1-octene copolymer polymerized by using a metallocene catalyst, having a melt flow rate of more than 15 g/10 min and not more than 200 g/10 min, and a density of 0.85 to 0.90 g/cm$^3$, and containing 15 to 50% by weight of 1-octene.

2. A propylene resin composition containing talc according to claim 1, wherein the density of the Unit A part of the component (a) is not less than 0.9070 g/cm$^3$.

3. A propylene resin composition containing talc according to claim 1, wherein the ethylene content of the Unit B part of the component (a) is 20 to 80% by weight.

4. A propylene resin composition containing talc according to claim 1, wherein the weight average molecular weight of the Unit B part of the component (a) is not more than 600,000.

5. A propylene resin composition containing talc according to claim 1, wherein the talc of the component (b) has an apparent volume weight ratio of not more than 2.50 ml/g, which is obtained by compressing and degassing at a compression ratio of not less than 1.10.

6. A propylene resin composition containing talc according to claim 1, wherein the talc of the component (b) is the talc having an apparent volume weight ratio of 0.90 to 2.20 ml/g which is obtained by compressing and degassing a talc powder whose length is substantially not more than 15 microns, whose average particle size is 1.5 to 6 microns, and whose average aspect ratio is not less than 5, at a compression ratio of not less than 2.00.

7. A propylene resin composition containing talc according to claim 1, wherein the ethylene/α-olefin copolymer of the component (c) is a copolymer having an ethylene triad sequence of 55 to 70% by weight.

* * * * *